May 12, 1964
J. R. WATSON
3,132,485
HYDRAULIC MOTOR CONTROL
Filed March 31, 1961
3 Sheets-Sheet 1
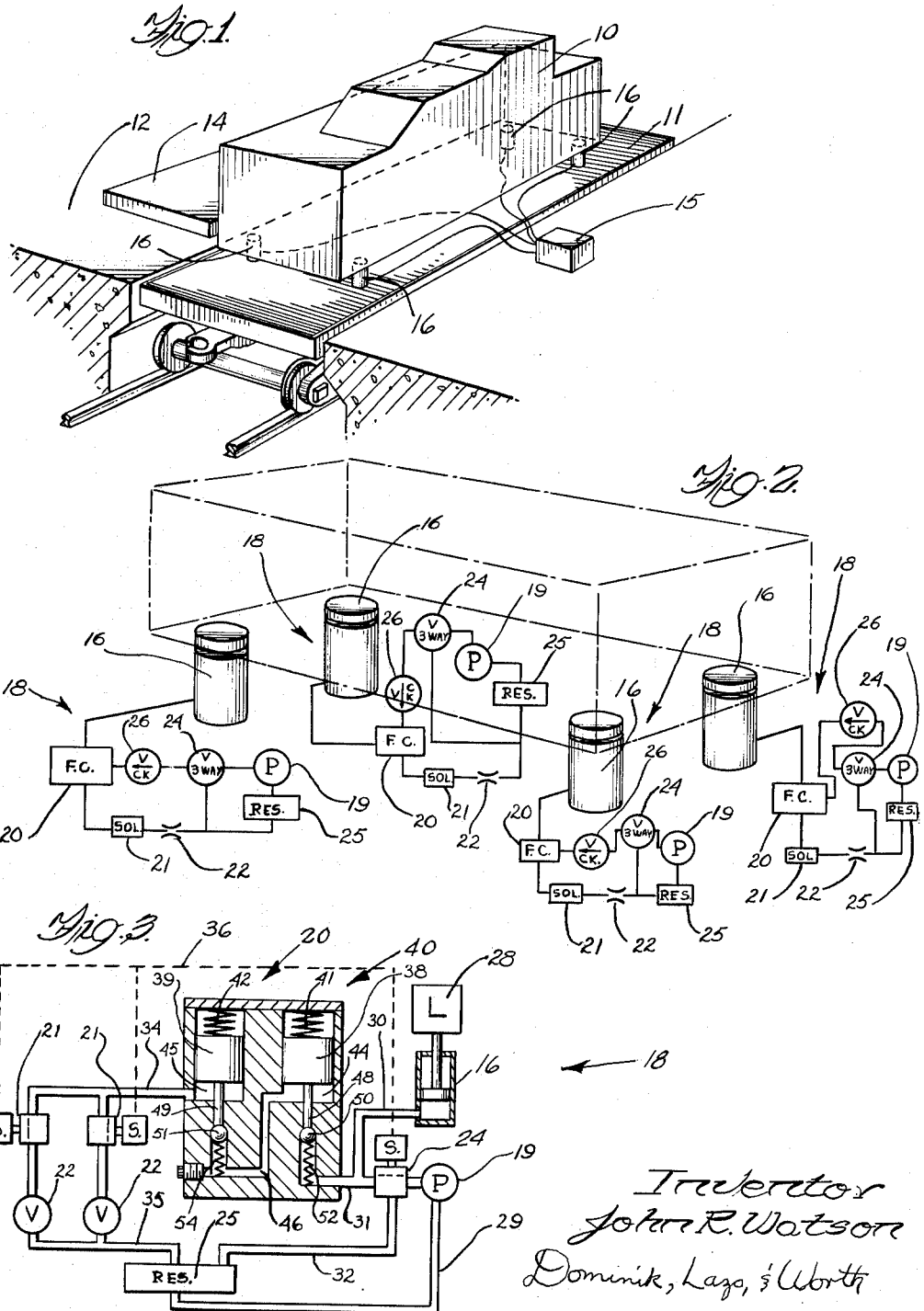
Inventor
John R. Watson
Dominik, Lazo, & Worth
Attorneys May 12, 1964 J. R. WATSON 3,132,485
HYDRAULIC MOTOR CONTROL
Filed March 31, 1961 3 Sheets-Sheet 2
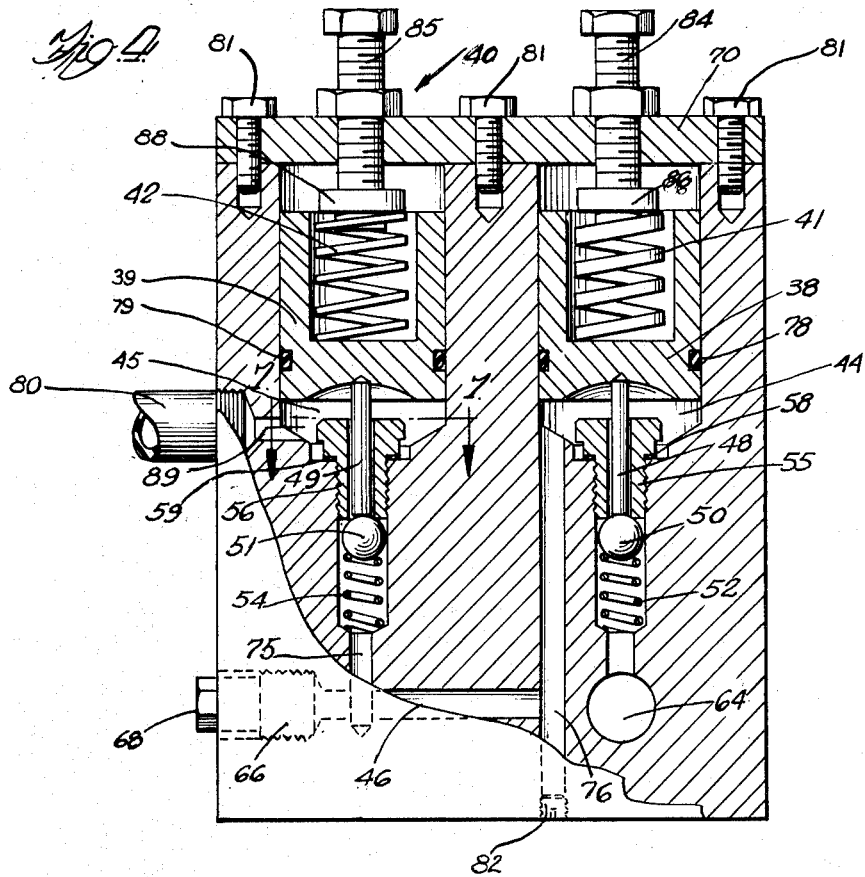
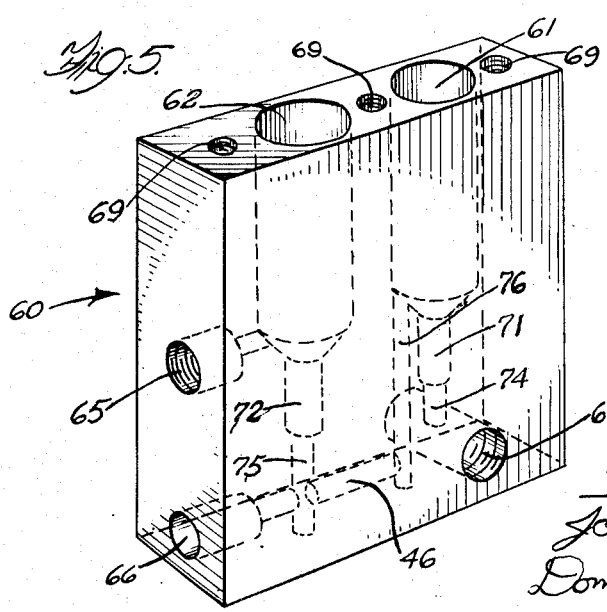
Inventor
John R. Watson
Dominik, Lapp, & Worth
Attorneys May 12, 1964

J. R. WATSON 3,132,485

HYDRAULIC MOTOR CONTROL

Filed March 31, 1961

Inventor
John R. Watson
Dominik, Lago & Worth
Attorneys

United States Patent Office 3,132,485
Patented May 12, 1964

3,132,485
HYDRAULIC MOTOR CONTROL
John R. Watson, Wauwatosa, Wis., assignor to
Blackhawk Mfg. Co.
Filed Mar. 31, 1961, Ser. No. 99,882
16 Claims. (Cl. 60—52)

The present invention relates to an hydraulic motor control, and more particularly to an hydraulic motor control system for accurately controlling the linear rate of motion of a motor throughout a wide variation of pressures. By wide variation of pressures, it is contemplated that the control system may be employed over line pressures varying from 300 to 10,000 p.s.i.

While a wide variety of hydraulic control systems are known in the art, very few of these systems can operate with pressures above 6,000 p.s.i., and none can be employed to meet all the advantages and perform the objects of the subject invention throughout the entire range between 300 and 10,000 p.s.i.

In view of the foregoing, it is one of the primary objects of the present invention to provide an hydraulic control system, which, through the range from low to high pressures, involves a no-leakage situation at the hold positions. Stated in other words, it is a positive seal system throughout its entire construction. A related object of the invention is to provide an hydraulic control with no by-pass leakage during metering, and therefore all flow passes through the meter which results in very accurate metering of the flow throughout the wide pressure range as intended.

Another and distinctly important object of the invention resides in the provision of a construction which is susceptible of manufacture by simple drill press and subassembly fabrication rendering the elements of the control inexpensive to manufacture.

Additionally, it is another object of the present invention to furnish an hydraulic control which accommodates decompression surges in the pressure reducing elements which are an integral portion of the control system.

A more detailed object of the invention looks to an hydraulic control which works accurately and dependably throughout the entire pressure range for which intended.

Still another object of the present invention is to provide an hydraulic control which has a shut-off valve at the low pressure side, therefore rendering the construction of the shut-off valve exceedingly inexpensive and commensurate with the important object of economical manufacture.

Further objects and advantages of the present invention will become apparent as the following description proceeds, taken in conjunction with the accompanying illustrative drawings in which:

FIG. 1 is a perspective partially sectioned view of a railway flat car having an unbalanced load which is being raised by hydraulic power supplied from a unit illustrative of the present invention.

FIG. 2 is a diagrammatic perspective view of the lifting system shown in FIG. 1.

FIG. 3 is a diagrammatic partially sectioned view illustrative of each of the flow control devices which are illustrated more generally in FIG. 2.

FIG. 4 is an enlarged front elevation of the control device, partially taken in transverse section to illustrate the interior elements thereof.

FIG. 5 is a perspective view of the valve block shown in front elevation in FIG. 4, the phantom lines indicating the various drilled-out portions to illustrate how all of the interior portions may be formed as by drilling.

Figure 6:
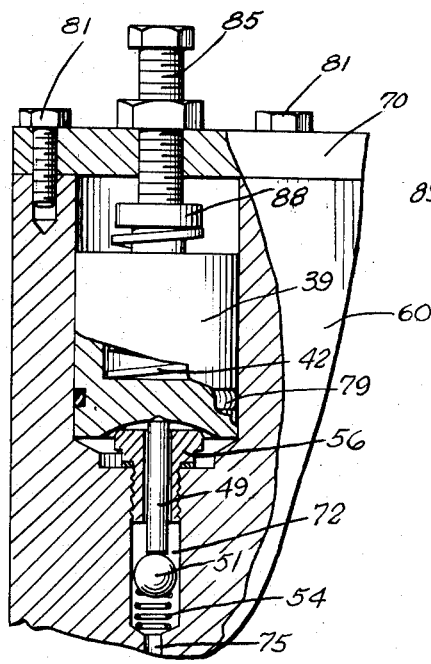
FIG. 6 is an enlarged partially broken, partially sectioned front elevation of one of the pressure chambers in the flow control disclosed in FIG. 4 showing the piston in the extended position where the check ball is off its seat and permitting full flow.

Before discussing the details of the subject hydraulic motor control, it is appropriate to understand the necessity for a control of this nature in a practical application. By referring to FIG. 1, there will be seen a transformer 10, illustrated diagrammatically, which is an unequal load on a flat car 11. The flat car 11 is located along a loading dock 12, and the intention is to move the transformer 10 onto the platform 14. A control console 15 is provided which may include a multi-piston positive displacement hydraulic pump, and is connected by means of several hydraulic lines to four single-acting rams 16. Additional multiples of single-acting rams may be employed if desired.

As will be observed, the transformer 10 constitutes an uneven distribution of load and accordingly the single-acting rams 16 will be required to exert varying forces on the transformer 10 in order to raise it at a steady rate, and in a level position. When it is appreciated that such a transformer unit 10, or other complex structures, may be susceptible of cracking or considerable damage in the event they are not raised uniformly from all four corners, and that such damage might occur to an integral portion of a piece of equipment costing many thousands of dollars, the importance of steady raising of the unit, and even lowering of the unit, becomes apparent. It is in order to provide a pre-selected accurate flow control for the hydraulic fluid entering each of the single-acting rams 16 that the embodiment of the invention described in detail herein is intended. It will be appreciated, of course, that a wide variety of other applications may also be employed, including applications whereby several rams may be employed for the purpose of straightening a member which was previously twisted, or otherwise rendered out of line.

Referring now to FIG. 2, it will be seen diagrammatically how the ram power units 18, four of which are shown here, are operated in order to achieve the even result intended as described above. Each individual ram power unit 18 includes a pump 19 which receives its source of fluid from a tank reservoir 25. A flow control unit 20 (to be described in greater detail hereinafter) is provided in the hydraulic line which also serves the single-acting ram 16. The flow control unit permits fluid to flow from the single-acting ram 16, through a solenoid controlled valve 21, into a flow control variable orifice 22 and thence back into the reservoir 25. A 3-way valve 24 is provided immediately beyond the positive displacement constant flow pump 19 in order to selectively direct the fluid either into the flow control unit and the ram, or alternatively, when the load is being held by means of the check valve 26, to return the flow back to the reservoir 25 for the idling position. As will be observed in FIG. 2, each of the rams 16 is connected to the entire flow control unit 20 and its over-all environment of the ram power unit 18. Varying applications of the flow control system as will be described hereinafter are possible, the essence of the system being to establish a constant pressure immediately above the flow control variable orifice 22 to insure constant flow therethrough regardless of the line pressure which exists adjacent the pump. Since the pump 19 is of a constant flow nature, variations in ram flow can be compensated by a fixed bleed-off through the flow control unit 20.

In greater detail a ram power unit 18 is shown in FIG. 3. There it will be seen that in setting up the unit for operation, the single-acting ram 16 may be first tested with a test load 28. The purpose of the test load is to load the piston within the ram 16 to such a point so that when the fluid from the pump 19 is directed toward the flow control unit 20, and thereafter into the flow control variable orifice 22, the rate of travel of the load 28 may be tested in both the up direction and the down direction. As disclosed in the circuit diagram, a pair of solenoid controlled valves 21 are employed immediately upstream of the flow control variable orifices 22, and are coordinated with the 3-way valve 24, and its associated solenoid, so that the variable control orifices 22 may be pre-selectedly set for a varying rate of travel of the load in the up and the down direction, all of which can be accurately pre-set as will be detailed theoretically hereinafter.

The pump 19 is supplied by means of an hydraulic supply line 29, which is connected to the reservoir 25. The ram actuating line 30 is located downstream of the 3-way valve 24, and receives its flow of fluid from the pump 19 in accordance with the pre-determined position of the 3-way valve 24.

A flow control by-pass line 31 is provided immediately downstream of the 3-way valve 24 in order that fluid be directed into the flow control unit 20. The fluid then passes through a chamber housing the inlet piston ball spring 52, and the inlet piston ball 50. The inlet piston ball 50 is unseated by the inlet piston extension or controller 48 responsive to the pressure in the inlet variable chamber 44. This pressure, when varied, acts upon the inlet piston 38, which in turn reacts against the inlet piston control spring 41, in a manner to control quite accurately the pressure within the inlet variable chamber 44.

The fluid after departing from the inlet variable chamber 44, passes through the pressure reducer connecting line 46 and past the discharge piston ball spring 54, and discharge piston ball 51, as controlled by the discharge piston extension 49, and thence into the chamber 45 which is the discharge variable chamber. After the fluid passes through the two-stage pressure reducer 40, as just detailed, the control of the discharge piston control spring 42 has left its final effect on the pressure of the fluid in the meter supply line 34. The fluid then passes through the meter supply line 34 past the junction immediately downstream therefrom, and then variably through the solenoid control valves 21.

When the fluid is not to be doing any work on the ram and its associated load 28, the 3-way solenoid control valve 24 is actuated so that the fluid passes through the idle return line 32 into the reservoir 25. When the pressure reducer 40 is passing fluid through as controlled by its inlet piston 38 and discharge piston 39, the fluid then passes alternatively through one of the variable orifice metering valves 22 and then through the meter discharge line 35 back into the reservoir 25. The electrical control circuit for coordinating the action of the three solenoids as indicated, is shown diagrammatically by the reference numeral 36, and may be wired in accordance with various techniques known in the art. As should appear obvious, the solenoid valves 21 and 24 are electrically coupled for simultaneous operation whereby hydraulic fluid will flow from the pump into line 31 at the same time hydraulic fluid is flowing in line 34 past the valve(s) 21, and will flow into line 32 to the reservoir 25 at the same time the valve(s) restrict flow of liquid in the line 34.

In theory, the first or inlet variable chamber 44 reduces the pressure from line pressure, which may run anywhere from 300 to 10,000 p.s.i., to a lower operating range through the pressure reducer connecting line 46. This pressure in turn is subsequently reduced in the discharge variable chamber 45. By running fluid through two such variable chambers, the accuracy of pressure control becomes a geometric function of the accuracy of each of the units, and accordingly the pressure in the line 34 may be very accurately controlled. Since the pressure in the line 34 is accurately controlled, the flow through the variable orifice 22 may also be accurately controlled.

Arithmetically the following is an analysis of the accuracy of the flow control:

Let:
$P1$=pressure in line 31
$P2$=pressure in line 46
$P3$=pressure in line 34
$A1$=area of ball seat of ball 50
$A2$=area of piston 38
$A3$=area of piston 39
$A4$=area of ball seat of ball 51
$K1$, $K2$=spring constants of springs 41, 42
$X1$, $X2$=deflections of springs of springs 41, 42

(1) $\quad P1A1 - P2A1 + P2A2 - K1X1 = 0$
(2) $\quad P2A4 - P3A4 + P3A3 - K2X2 = 0$ Since $P2A1$ is very small compared to $P1A1$ (see functional description of valve) it can be assumed $P2A1$ approximates 0 without loss of accuracy. Similarly $P3A4$ approximates 0. Also for the specific valve disclosed herein: $A2 = A3$ (this is not necessary for the operation of the valve, but is a manufacturing convenience).

From (1); (3) $\quad P2 = \dfrac{K1X1 - P1A1}{A2}$

From (2); (4)
$$P3 = \dfrac{K2X2 - P2A4}{A3} = \dfrac{K2X2 - P2A3}{A2}$$

Substitute (3) in (4)

(5) $\quad P3 = \dfrac{K2X2}{A2} - \dfrac{A3}{A2}\left[\dfrac{K1X1 - P1A1}{A2}\right]$ $$P3 = \dfrac{1}{A2}\left[K2X2 - \dfrac{K1X1A3}{A2} + \dfrac{P1A1A3}{A2}\right]$$

Then assume that for this specific valve:

$$A2 = 100A1 = 100A3$$

$$P3 = \dfrac{1}{A2}\left[K2X2 - \dfrac{K1X1\dfrac{A2}{100}}{A2} + \dfrac{\dfrac{A2}{100} \times \dfrac{A2}{100}}{A2} \times P1\right]$$

$$P3 = \dfrac{K2X2}{A2} - \dfrac{K1X1}{100A2} + 0.0001P1$$

For P2 approximate 270 p.s.i. max. and P3 140 p.s.i. max.

Then: $K1X1$ approximates $270A2$ and $L2X2$ approximates $140A2$ $$P3 = 140 - \dfrac{270}{100} + 0.0001P1 = 137.3 + 0.00001P1$$

*Conclusion.*—As may be seen from the above, if P1 line pressure varies from 300 p.s.i. to 10,000 p.s.i., P3, the controlled pressure varies from 137.33 p.s.i. to 138.30 p.s.i. or $$\dfrac{138.30 - 137.33}{137.33} \times 100 = .7063\%$$

thereby providing good pressure regulation in front of the metering valve and assuring a constant flow in spite of radical line pressure variations.

Thus it will be seen that a very accurate flow control may be achieved by the subject system. An additional and most important feature of the invention is the simplicity with which a practical embodiment of the device may be made. By reference to FIGS. 4 and 5, it will be seen that the entire unit may be readily built up in a single pressure reducer block 60. The block 60, as will be shown in FIG. 5 hereinafter is formed from a single block of metal, and all of the forming operations may be done with a drill press, or a simple tap. Referring now to FIG. 4, it will be seen that each unit has an inlet ball seat bushing 55, and a discharge ball seat bushing 56. As detailed above, the area relationship between the inlet ball 50 and the discharge ball 51 and the respective bushings is importantly involved in the operation of the unit, but the tolerances with regard to these areas may be quite wide since the net result of the two, working in cooperation, is to achieve such accuracy in pressure at the meter supply line 34 that the flow passing through the variably controlled orifice 22 will be exceedingly accurate.

Each inlet and discharge bushing 55, 56 is threaded into position and sealed in place with an appropriate inlet bushing washer 58 and discharge bushing washer 59. The inlet cylinder 61 and the discharge cylinder 62 are formed by boring holes within the pressure reducer block 60. Then an inlet 64 and an outlet 65 are respectively drilled and tapped into the pressure reducer block 60 so that the appropriate inlet lines and discharge lines may be threadedly engaged with the unit.

A connection line plug bore 66 and a connection line plug 68 are provided to seal off the far end of the connection line 46. While this is an expedient of manufacture, it renders the design susceptible of simple fabrication as outlined above. Three cap plate mounting threaded holes 69 as shown here, may be provided in the upper portion of the pressure reducer block 60. The cap plate mounting threaded holes 69 are engaged by the cap studs 81, which in turn secure the pressure reducer cap plate 70 into position atop the pressure reducer block 60.

An inlet bushing bore 71 is provided at the lower portion of the inlet cylinder 61, and threadedly houses the inlet bushing 55 at its upper portion, and the inlet control spring 52 and its associated ball 50 at its lower portion. Similarly the discharge bushing bore 72 bears its associated relationship with the discharge cylinder 62. The inlet ball spring bore 74, and the discharge ball spring bore 75 function as indicated above, and are merely variations in diameter along the same longitudinally oriented bore within the pressure reducer block 60.

A longitudinal connecting line 76 is connected by means of the intersection with the pressure reducer connecting line 46, which is plugged at its end by means of the connection line plug 68 in order to inter-relate in fluid connection the respective inlet and discharge cylinders 61, 62. Each of the inlet piston 38 and discharge piston 39 are provided respectively with inlet piston ring 78 and discharge piston ring 79 in order that a dynamic fluid seal be achieved between the piston and its cylinder. Since the pressure within the variable chambers 44, 45 is quite low, the sealing effect of the respective inlet piston ring 78 and discharge piston ring 79 is sufficiently complete to virtually eliminate any leakage. By orienting the valve in a vertical position, or providing suitable drains if need be in the area behind the respective pistons, the loss of fluid through the variable chambers 44, 45, and the connecting line 46 may be held to an irreducible minimum. The discharge line 80 is shown threadedly engaged with the outlet 65.

A longitudinal line plug 82 is provided at the lower portion of the longitudinal connecting line 76 in order to seal off the necessary entry required for drilling the line into position. This also serves as a means for cleaning the unit when disassembled for service.

The spring loading provided by the inlet piston control spring 41 and the discharge piston control spring 42 is controlled by means of the inlet piston spring adjustment 84 and the discharge piston spring adjustment 85. As will be seen, each of these adjustments contemplates a threaded shaft having an inlet spring abutment 86 and a discharge spring abutment 88 at their respective lower portions. The abutments are provided with a shoulder at their end portion in order to concentrically and interiorly engage the respective control springs 41, 42.

By reviewing the construction as shown in FIGS. 4 and 5, it is believed that it will become very apparent that the operations in fabricating the subject valve are primarily those of boring out the various bores in the pressure reducer block 60 as illustrated by phantom lines in FIG. 5. After the block 60 is appropriately drilled, the tapped connections are then provided for, and the interior elements are assembled into position.

Figure 7:
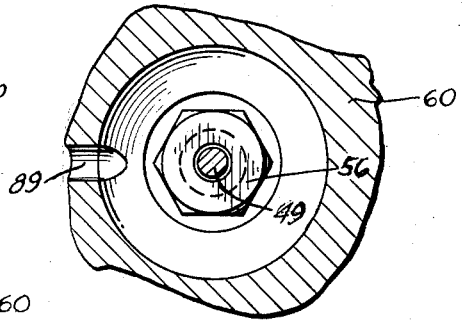
FIG. 7 is a transverse enlarged partially broken section view of the ball seat taken along section line 7—7 of FIG. 4.

As will be seen from FIG. 7, the bushing (here shown as the discharge ball seat bushing 56) has a hexagonal head so that it can be placed in position by means of a socket wrench and an extended shaft. The discharge outlet 89 has been bored directly into the discharge variable chamber 45.

Figure 8:
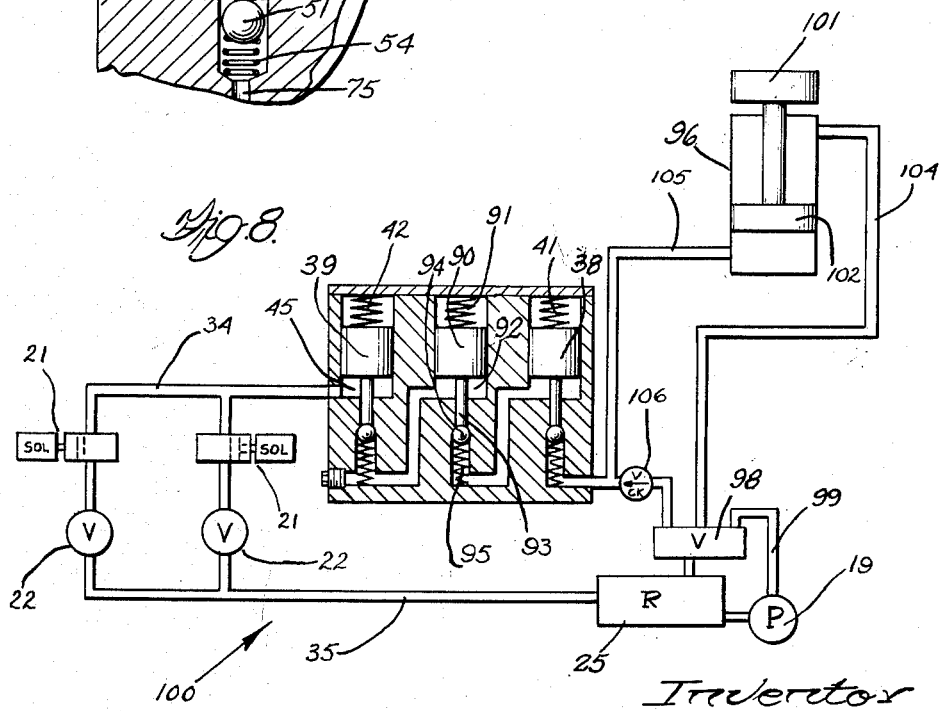
FIG. 8 is a diagrammatic partially sectioned view of a flow control utilizing three stages and providing greater accuracy than that illustrated in FIG. 3, and discloses a double acting hydraulic motor.

While there has been discussed above in detail a 2-cylinder flow control unit, there will be seen in FIG. 8 a unit in which an intermediate piston 90 has been provided in order to facilitate high pressure control, and accordingly even greater accuracy in the flow control achieved by the pre-setting of the variable line orifices 22. FIG. 8 has been marked with reference indicia the same as applied above, but additionally there has been shown at an intermediate portion an intermediate piston 90, which is controlled by an intermediate piston control spring 91. The intermediate chamber 92 is connected with the discharge variable chamber 45 by means of an appropriate line. The amount of fluid admitted into the intermediate chamber 92 is a function of the fluid which passes the intermediate ball 94 and intermediate ball spring 95 as actuated by the intermediate piston extension 93. The unit as shown in FIG. 8, is provided with a double acting cylinder 96, and a solenoid controlled 4-way valve 98. The pump line 99 goes directly into the 4-way valve 98, and the load 101 is moved by the double acting piston 102, and the return line 104 is coordinated with the load line 105 by means of the 4-way valve 98 in order to achieve appropriate pre-selected motion of the double acting piston 102. The load may be held in any particular position by means of the ball check 106. Thus, extreme accuracy has been provided by employing three variable pressure chambers, all of which function against a positive seal, in a double acting piston 2-way flow control system 100 which is readily controlled by push-buttons, switches from a control panel, an automatic computer, or any other appropriate system for forwarding intelligence to the solenoids which may control the 4-way valve, and the solenoid control valves 21.

*Operation*

Referring to FIG. 3, the pump 19 can be assumed to deliver a constant flow of fluid to the 3-way valve 24. During the idle condition when no action is to take place, the 3-way valve 24 is actuated by means of its solenoid or other controller to divert fluids to the idle return line 32 to the reservoir 25. Upon actuating the 3-way valve 24, the fluid then passes through the ram actuating line 30 and may also pass through the flow control by-pass line 31. The fluid going into the ram 16, of course, will operate to move the load 28. The fluid which passes into the flow control by-pass line 31 will then by-pass the inlet piston ball 50 and fill the inlet variable chamber 44 until such time as the pressure in the chamber 44 approaches that which is pre-selected by means of adjusting the inlet piston control spring 41. For good commercial results, excellent experience has been achieved when the pressure in the inlet variable chamber 44 has been pre-set to approximate 270 p.s.i. When the pressure in the chamber influenced by the very high pressure coming in through the flow control by-pass line 31 exceeds 270 p.s.i., the action on the inlet piston 38 moves it against the inlet piston control spring 41 thereby moving the piston 38 rearwardly and its associated inlet piston extension 48. As the extension 48 moves, the inlet piston ball 50 is seated against its appropriate seat by means of the fluid co-acting with the inlet piston ball spring 52. This action will continue in a "hunting" or fluctuating manner throughout the entire operation of the valve.

The fluid by-passes through the pressure reducer connecting line 46 into the discharge variable chamber 45. The discharge variable chamber pressure is controlled by the discharge piston control spring 42 to approximate 140 p.s.i. The action of the discharge piston 39 and its coordinated spring 42 is the same, in theory, as the inlet piston 38. Thus the two pistons work together with their associated chambers to reduce the pressure to the point where, when it enters the meter supply line 34, it is a small function of the pressure in the flow control by-pass line 31. As has been outlined arithmetically above, exceedingly wide variations in pressure may take place in the flow control by-pass line 31 and the ram actuating line 30, with errors of less than 1% variation taking place in the meter supply line 34. After the fluid has achieved a relatively constant pressure in the meter supply line 34, the fluid then passing through the flow control variable orifice 22 will be of a relatively constant flow for any given setting.

It will be appreciated that appropriate check valves, and relief valves may be installed at various points throughout the system in order to protect from line surges and the like. However, the variable chambers provided in the type of valve as discussed herein are such to, in themselves, accommodate a wide variety of surges without necessitating the employment of relief valves. Thus the system inherently is self-protecting. When adjusting the unit for operation such as illustrated in FIG. 1, the employment of two flow control variable orifices 22, one set to work in the load direction to provide ram movement at a first rate of travel, and the other set to work in the return direction to provide ram movement at a second rate of travel (generally greater than the first rate of travel), provides for complete, metered flow during the entire operation. In this manner, by testing the unit in advance with a sample load such as shown in FIG. 3, even though the load may vary substantially from that actually intended, the error in the high pressure side is reduced so greatly by the time it reaches the variable orifice meter, that accuracy can be predicted by placing the sample loads on the various rams. In addition, if the sample loads are proportioned to approximate the relative ratio of the varying loads that will be experienced by each of the rams in operation, any errors will be cancelled out and constant coordinated linear motion of all of the rams may be readily predicted.

A further advantage of the unit shown in FIG. 8 lies in "fail safe" prevention from inadvertent release. Since the ball check 106 prevents the discharge fluid from returning to the reservoir, the discharge fluid must of necessity pass through the meter and a variable orifice 22. Thus inadvertent opening or diversion of the valve 24 will not result in abrupt movement of the load 28. The device therefore is "fail safe" in addition to surge resistant.

In review it will be seen that two examples have been shown of a hydraulic motor control unit, the primary object of which is to provide precise flow control by means of very accurate pressure reduction. The pressure reduction achieved is unique for high pressure systems, and can accommodate a wide variation in fluid pressures all the way from 300 p.s.i. up to 10,000 p.s.i. which are the known practical limitations of existing hydraulic pumps. When commercial embodiments are developed of pumps operating at higher pressures, and the appropriate lines and connections are available commercially, the subject type hydraulic motor control may be employed at even such higher pressures with similar accuracy in operation. All of these advantages have been achieved in a construction which is susceptible of inherently low manufacturing costs, and very low maintenance in the field. The low maintenance and low cost combine with a result of unusual dependability in operation.

Although a particular embodiment of the invention has been shown and described in full here, there is no intention to thereby limit the invention to the details of such embodiment. On the contrary, the intention is to cover all modifications, alternative embodiments, usages and equivalents of the hydraulic motor control as fall within the spirit and scope of the invention, specification, and appended claims.

The invention claimed is:

1. A motor control system for a high pressure hydraulic motor, said system including a by-pass adjustable flow control valve, said flow control valve having a variable load low pressure chamber fluid actuated controller and a high pressure positive seal, and a variable orifice valve control means downstream of said flow control valve, said flow control and variable orifice valves being positioned in the system to by-pass a portion of the high pressure fluid directed toward the motor whereby the operating speed of the motor is maintained substantially constant.

2. A motor control system for high pressure fluids in the range from at least 300 to 10,000 p.s.i., said system comprising, in combination, a constant flow high pressure pump, a motor, a line from said pump to said motor, a multi-path valve in said motor line, a flow valve, a line from said multi-path valve to said flow valve, a line from said multi-path valve to tank, said flow valve having at least one variable loaded piston, an extension on said piston, a high pressure ball actuated by said extension, said ball being connected to said flow valve line, an on-off valve downstream of said flow valve, a variable orifice valve downstream of said on-off valve, a line from said variable orifice valve to tank, and control means for said multi-path valve and said on-off valve coordinating the operation of both to direct fluid through the variable orifice while fluid is actuating the motor thereby permitting a pre-selected by-pass to accurately control the motor travel under varying preselected load conditions.

3. A motor control system for high pressure fluids in the range from at least 300 to 10,000 p.s.i., said system comprising, in combination, a constant flow high pressure pump, a motor, a line from said pump to said motor, a multi-path valve in said motor line, a flow valve, a line from said multi-path valve to said flow valve, a line from said multi-path valve to tank, said flow valve having a plurality of yieldably loaded pistons, an extension on each said piston, a high pressure ball actuated by each said extension, said balls being connected to said flow valve line, an on-off valve downstream of said flow valve, a variable orifice valve downstream of said on-off valve, a line from said variable orifice valve to tank, and control means for said multi-path valve and said on-off valve coordinating the operation of both to direct fluid through the variable orifice while fluid is actuating the motor thereby permitting a pre-selected by-pass to accurately control the motor travel under varying pre-selected load conditions.

4. A motor control system for high pressure fluids in the range from at least 300 to 10,000 p.s.i., said system comprising, in combination, a constant flow high pressure pump, a motor, a line from said pump to said motor, a multi-path valve in said motor line, a flow valve, a line from said multi-path valve to said flow valve, a line from said multi-path valve to tank, said flow valve having at least one variable loaded piston, an extension on said piston, a high pressure ball actuated by said extension, said ball being connected to said flow valve line, a plurality of on-off valves downstream of said flow valve, a plurality of variable orifice valves downstream of each of said on-off valves, a line connecting each of said variable orifice valves to tank, and control means for said multi-path valve and said on-off valves coordinating the operation of all to direct fluid through the variable orifice while fluid is actuating the motor thereby permitting a pre-selected by-pass under load and return actuation of said motor to accurately control the motor travel under varying pre-selected load conditions.

5. A fail safe system of the character defined in claim 4 above in which a one way ball check is located in the pump to motor line so that on return actuation of said motor under no load conditions all fluid must pass through said flow valve.

6. A method for accurately controlling the rate of travel of a motor actuated by pressure fluid comprising the steps of connecting a constant delivery pump to the motor, connecting a pressure reducer having a positive seal to by-pass fluid from the pump to the motor, placing a variable orifice downstream of the pressure reducer, putting a test load on the motor and adjusting the rate of motor travel by varying the variable orifice, and then putting the intended load on the motor which will then move at the rate pre-selected by the variable orifice as the variable orifice by-passes a given amount of fluid.

7. In a system wherein a fluid pump directs a high pressure fluid to a fluid motor, a method of controlling the rate of motor operation comprising the steps of pumping a constant quantity of fluid from the pump and directing the fluid pumped to the fluid motor while diverting a portion of the fluid through a series path including a multi-stage pressure reducer with an orifice downstream thereof.

8. The method of claim 7 wherein said fluid is a hydraulic fluid.

9. The method of claim 7 wherein said orifice is an adjustable orifice.

10. The method of claim 7 wherein said orifice is an adjustable orifice; and adjusting said orifice to control said diverted portion to provide a predetermined rate of motor operation.

11. A method for accurate flow control of a high pressure fluid pump motor system comprising the steps of connecting a high pressure positive seal pressure reducer to a line connecting a high pressure motor to a pump, connecting a variable orifice to the discharge of the pressure reducer, the pressure reducer being multi-stage whereby the pressure variations in the high pressure line are minimized in the low pressure discharge from the pressure reducer and therefore in the flow through the pressure reducer, and adjusting the variable orifice to accurately control flow irrespective of the line pressure variations to the motor.

12. A method for accurate flow control of a pressurized fluid comprising the steps of connecting a multi-stage pressure reducer to a line connecting a motor to the discharge of a constant delivery pump and connecting an orifice to the discharge of the pressure reducer, the orifice being sized to divert a pre-determined portion of the fluid discharged from said pump.

13. A method for accurate flow control of a pressurized hydraulic fluid comprising the steps of connecting a multi-stage pressure reducer to a conduit connecting a motor and the discharge of a constant delivery hydraulic pump, connecting an orifice downstream of said pressure reducer, the orifice being sized to divert a pre-determined portion of the fluid discharge from said pump.

14. A method for accurate flow control of a pressurized hydraulic fluid comprising the steps of connecting a multi-stage pressure reducer to a conduit connecting a motor and the discharge of a constant delivery hydraulic pump, connecting a variable orifice downstream of said pressure reducer, and adjusting said orifice to divert from said motor a predetermined portion of the constant quantity discharged from said pump.

15. A method for accurately controlling the operational rate of a hydraulic motor driven by hydraulic fluid discharged from a constant delivery hydraulic pump and comprising the steps of connecting said displacement pump to said motor, connecting a multi-stage pressure reducer having a positive seal to by-pass fluid from the motor, placing a variable orifice downstream of the pressure reducer, putting a test load on the motor and adjusting the motor travel by varying the variable orifice, and then putting the intended load on the motor which will then move at the rate pre-selected by the previously set adjustment of the variable orifice as the variable orifice bypasses a given amount of fluid.

16. A control system for a high pressure hydraulic motor, said system including a flow control unit having a hydraulic fluid pressure reduction means adapted to reduce the pressure of the fluid passing therethrough from a variable high pressure to a substantially constant low pressure, said flow control unit being arranged to bypass a given amount of hydraulic fluid from a high pressure pump to a motor, and a flow control variable orifice adapted to regulate flow of low pressure hydraulic fluid from the flow control unit.

References Cited in the file of this patent

UNITED STATES PATENTS

| | | |
|---|---|---|
| 1,003,916 | Koenig | Sept. 19, 1911 |
| 1,731,519 | Bastian | Oct. 15, 1929 |
| 2,102,865 | Vickers | Dec. 21, 1937 |
| 2,118,779 | Rippl | May 24, 1938 |
| 2,265,800 | Connor et al. | Dec. 9, 1941 |
| 2,272,684 | Vickers | Feb. 10, 1942 |
| 2,310,930 | Blanchett | Feb. 16, 1943 |
| 2,367,115 | Geopfrich | Jan. 9, 1945 |
| 2,375,946 | Reichelt | May 15, 1945 |
| 2,462,983 | MacDuff et al. | Mar. 1, 1949 |
| 2,576,443 | Brandstrom | Nov. 27, 1951 |
| 2,940,262 | Pfitzenmeier | June 14, 1960 |
| 2,980,064 | Norton et al. | Apr. 18, 1961 |
| 3,024,798 | Banker | Mar. 13, 1962 |